(12) United States Patent
Kjær

(10) Patent No.: US 9,374,014 B2
(45) Date of Patent: Jun. 21, 2016

(54) HIGH-VOLTAGE POWER CONVERTER

(71) Applicant: Vestas Wind Systems A/S, Aarhus N (DK)

(72) Inventor: Philip Carne Kjær, Aarhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 780 days.

(21) Appl. No.: 13/686,579

(22) Filed: Nov. 27, 2012

(65) Prior Publication Data

US 2013/0181532 A1    Jul. 18, 2013

Related U.S. Application Data

(63) Continuation of application No. PCT/DK2011/050177, filed on May 27, 2011.

(60) Provisional application No. 61/349,020, filed on May 27, 2010.

(30) Foreign Application Priority Data

May 27, 2010 (DK) .................................. 2010 70221

(51) Int. Cl.
| | |
|---|---|
| H02J 1/00 | (2006.01) |
| H02M 5/458 | (2006.01) |
| H02M 1/34 | (2007.01) |
| H02M 7/523 | (2006.01) |
| H02M 7/5387 | (2007.01) |
| H02M 7/487 | (2007.01) |
| H02M 7/483 | (2007.01) |

(52) U.S. Cl.
CPC .............. *H02M 5/4585* (2013.01); *H02M 1/34* (2013.01); *H02M 7/523* (2013.01); *H02M 7/5387* (2013.01); *H02M 7/487* (2013.01); *H02M 2001/342* (2013.01); *H02M 2007/4835* (2013.01); *Y02B 70/1491* (2013.01); *Y10T 307/707* (2015.04)

(58) Field of Classification Search
CPC . H02M 1/34; H02M 7/523; H02M 2001/342; H02M 5/4585; Y10T 307/707; Y02B 70/1491
USPC .......................................................... 307/77
See application file for complete search history.

(56) References Cited

U.S. PATENT DOCUMENTS

| | | | | |
|---|---|---|---|---|
| 7,622,815 B2* | 11/2009 | Rivas | ...................... | H02P 9/102 290/44 |
| 2006/0131428 A1* | 6/2006 | Wang | .................. | G06K 19/0701 235/492 |
| 2007/0279815 A1* | 12/2007 | Li | .......................... | F03D 7/0248 361/54 |
| 2011/0198854 A1* | 8/2011 | Minami | .................. | F03D 1/003 290/55 |

OTHER PUBLICATIONS

"Active-clamp resonant dc link converter with hybrid thyristor-transistor valves", anonymous, Research Disclosure database No. 449041; ISSN 0374-4353; Sep. 2001.*

* cited by examiner

*Primary Examiner* — Jared Fureman
*Assistant Examiner* — Duc M Pham
(74) *Attorney, Agent, or Firm* — Patterson + Sheridan, LLP

(57) ABSTRACT

The present invention relates to a high-voltage power converter comprising a number of controllable switching valves, each switching valve comprising a plurality of series connected switching units, the high-voltage power converter further comprising a resonance circuit comprising a link inductor and a link capacitor, and a plurality of clamping circuits connected in series, each clamping circuit comprising a clamping capacitor and a clamping switching unit.

18 Claims, 12 Drawing Sheets a)
(Prior art)

HIGH-VOLTAGE POWER CONVERTER

CROSS-REFERENCE TO RELATED APPLICATIONS

This application is a continuation of co-pending PCT patent application No. PCT/DK2011/050177, filed May 27, 2011, which claims the benefit of Danish patent application serial number PA 2010 70221, filed May 27, 2010 and U.S. provisional patent application Ser. No. 61/349,020, filed May 27, 2010. Each of the aforementioned related patent applications is herein incorporated by reference in its entirety.

BACKGROUND

The present invention relates to a transformerless wind turbine generator. In particular, the present invention relates to a wind turbine generator having a high-voltage power generator operatively connected to a high-voltage power converter so that the traditional step-up transformer can be omitted. Also, the present invention relates to high-voltage power rectifier/inverter/converter solutions suitable for use in high-voltage, transformerless wind turbine generators.

Traditionally, wind turbine generators are equipped with step-up transformers in order to match a 0.69-6 kVac generator voltage level with a grid voltage level of 10-35 kVac. However, there are several disadvantages associated with step-up transformers in wind turbine generators—the most significant of these being related to increased power conversion losses, increased component count, cost, weight and volume. Finally, step-up transformers induce an increased risk of turbine failures—potentially turbine breakdowns. Thus, there is a strong need and a wish to remove step-up transformers from wind turbine generators.

One immediate problem arising from a removal of a step-up transformer is that the power converter, typically including a rectifier and an inverter separated by a DC-link, must be operable at voltages levels of 10-35 kVac. Also, the power generator needs to be operable at such power levels. In order to operate power converters at a 10-35 kVac voltage level the individual valves of the rectifier and the inverter of the power converter must be capable of blocking such voltage levels. This may be achieved by connecting a number of, for example, IGBTs in the valves of the power converter in series.

However, connecting semiconductor devices like IGBTs in series is known to be a rather difficult task due to voltage balancing problems arising from different switching times of the IGBTs. If the voltage across series-connected IGBTs are not properly balanced overvoltage levels typically ends up on specific IGBTs. In particular, during turn off, the generated transient voltage is superimposed on the main voltage level increasing the risk of device damage. Thus, controlling the voltage balance is very critical when IGBTs are connected and operated in series.

SUMMARY

It may be seen as an object of embodiments of the present invention to provide a high-voltage, transformerless wind turbine generator, i.e. a wind turbine generator where the traditional step-up transformer has been omitted.

It may be seen as a further object of embodiments of the present invention to provide a high-voltage power converter for wind turbine generators, i.e. a power converter capable of generating a high-voltage output so that the traditional step-up transformer can be omitted.

The above-mentioned objects are complied with by providing, in a first aspect, a high-voltage wind turbine generator comprising a high-voltage power generator and a high-voltage power converter operatively connected thereto, the high-voltage power converter being adapted to deliver high-voltage power to an associated power distribution grid or sub-grid without use of step-up transformer means inserted between the high-voltage power converter and the associated power distribution grid or sub-grids.

In a second aspect the present invention relates to a high-voltage wind turbine generator comprising a high-voltage power generator and a high-voltage power converter operatively connected thereto, the high-voltage power converter being adapted to deliver high-voltage power directly to an associated power distribution grid or sub-grid.

In a third aspect the present invention relates to a high-voltage wind turbine generator comprising a high-voltage power generator and a high-voltage power converter operatively connected thereto, the high-voltage power converter being adapted to deliver high-voltage power having a first voltage level to an associated power distribution grid or sub-grid, said grid or sub-grid having a nominal voltage level being essentially equal to the first voltage level.

In a fourth aspect the present invention relates to a step-up transformerless high-voltage wind turbine generator comprising a high-voltage power generator and a high-voltage power converter operatively connected thereto, the high-voltage power converter being adapted to deliver high-voltage power to an associated power distribution grid or sub-grid.

Thus, all of the above-mentioned aspects are directed towards different solutions for removing the traditional step-up transformer. According to the first aspect it is specifically mentioned that the no step-up transformer is inserted between the high-voltage power converter and the associated power distribution grid or sub-grids. The term "directly" mentioned in the second aspect allows that for example a switch gear or other voltage preserving means may be inserted between the high-voltage power converter and the associated power distribution grid or sub-grids. Similarly the term "step-up transformerless" mentioned in the fourth aspect addresses that no step-up transformer is inserted between the high-voltage power converter and the associated power distribution grid or sub-grids. Obviously, there may be other transformers within the wind turbine generator.

In all of the above-mentioned four aspect the term high-voltage is to be understood as a voltage level typically being between 10 and 50 kV AC or DC. Thus, in the present context the term high-voltage overlaps at least partly with the medium-voltage range as defined in the IEC standard. Thus, the high-voltage power converter should be adapted to generate power voltage levels between 10 and 50 kV AC or DC.

The terms sub-grid may be a collector grid within a wind power plant.

In case the high-voltage converter generates an AC power output, the converter may comprise a number of controllable switching valves, each switching valve comprising a plurality of series connected switching units, each switching unit comprising a controllable semiconductor switch and a semiconductor diode in an anti-parallel connection.

In one embodiment the high-voltage power converter may comprise a multi-level neutral point clamped inverter, such as a 3-level, a 5-level, a 7-level or even a higher level inverter. In another embodiment the high-voltage power converter may comprise a multi-level flying capacitor multi-level inverter. Alternatively, in a third embodiment the high-voltage power converter may comprise a number of stacked inverters.

Typically, the high-voltage power converter is adapted to generate AC power in three phases. In addition, the high-voltage power converter may be adapted to generate AC power, such as three phase AC power, having a frequency within the range 10-100 Hz, such as for example around 16⅔, 25, 50 or 60 Hz.

In one embodiment the high-voltage power converter comprises a AC/DC rectifier and a DC/AC inverter operatively interconnected by a DC-link. Such high-voltage power converter may be applicable in full-scale wind turbine generators. The high-voltage power converter may be configured as a back-to-back converter, such as a four-quadrant converter. Alternatively, the high-voltage power converter may be configured as a two-quadrant converter.

The high-voltage power converter may, alternatively, be adapted to generate power voltage levels between 10 and 50 kVdc. This allows that the wind turbine generator may feed its power directly into a DC distribution grid or sub-grid, such as a DC collector grid.

The wind turbine generator may be adapted to deliver a nominal power level within the range 2-10 MW. Also, the wind turbine generator may be configured as a full-scale wind turbine generator. Moreover, the high-voltage power generator should be capable of generating power voltage levels between 10 and 50 kVac.

In a fifth aspect the present invention relates to a wind power plant comprising a plurality of the wind turbine generators according to any of the above-mentioned aspects.

In a sixth aspect the present invention relates to a method for delivering high-voltage power to an associated power distribution grid or sub-grid without use of step-up transformer means inserted between a high-voltage power converter and the associated power distribution grid or sub-grid, the method comprising the step of providing a high-voltage wind turbine generator comprising a high-voltage power generator and a high-voltage power converter operatively connected thereto, the high-voltage power converter being adapted to deliver high-voltage power directly to the associated power distribution grid or sub-grid.

In a seventh aspect the present invention relates to a method for delivering high-voltage power to an associated power distribution grid or sub-grid without use of step-up transformer means inserted between a high-voltage power converter and the associated power distribution grid or sub-grid, the method comprising the step of providing a high-voltage wind turbine generator comprising a high-voltage power generator and a high-voltage power converter operatively connected thereto, the high-voltage power converter being adapted to deliver high-voltage power having a first voltage level to the associated power distribution grid or sub-grid, said grid or sub-grid having a nominal voltage level being essentially equal to the first voltage level.

In an eighth aspect the present invention relates to a high-voltage power converter comprising a number of controllable switching valves, each switching valve comprising a plurality of series connected switching units, the high-voltage power converter further comprising a resonance circuit comprising a link inductor and a link capacitor, and a plurality of clamping circuits connected in series, each clamping circuit comprising a clamping capacitor and a clamping switching unit.

The power converter may be adapted to generate power voltage levels between 10 and 50 kV.

The link inductor may be formed by distributed link inductors, i.e. a plurality of inductors. Each clamping circuit may comprise a distributed link inductor.

The high-voltage power converter may be implemented so that at least one switching unit may comprise a transistor and a diode coupled in an anti-parallel connection. In combination therewith or in replacement thereof at least one switching unit may comprise a thyristor and a diode coupled in an anti-parallel connection. Thus, the high-voltage power converter may comprise a switching valve comprising a first and a second switching unit, wherein the first switching unit comprises a transistor and a diode coupled in an anti-parallel connection, and wherein the second switching unit comprises a thyristor and a diode coupled in an anti-parallel connection, the first and second switching modules being connected in series.

The link capacitor may be formed by distributed link capacitors, i.e. a plurality of capacitors. The high-voltage power converter may be implemented so that at least one switching unit comprises a distributed link capacitor. Alternatively, each switching unit may comprise a distributed link capacitor.

In an ninth aspect the present invention relates to a high-voltage wind turbine generator comprising a high-voltage power converter according to the eighth aspect.

In a tenth and final aspect the present invention relates to a wind power plant comprising a plurality of high-voltage wind turbine generators according to the eighth aspect.

BRIEF DESCRIPTION OF THE DRAWINGS

The present invention will now be explained in further details with reference to the accompanying drawings, wherein.

DETAILED DESCRIPTION OF THE PREFERRED EMBODIMENT

Figure 1:
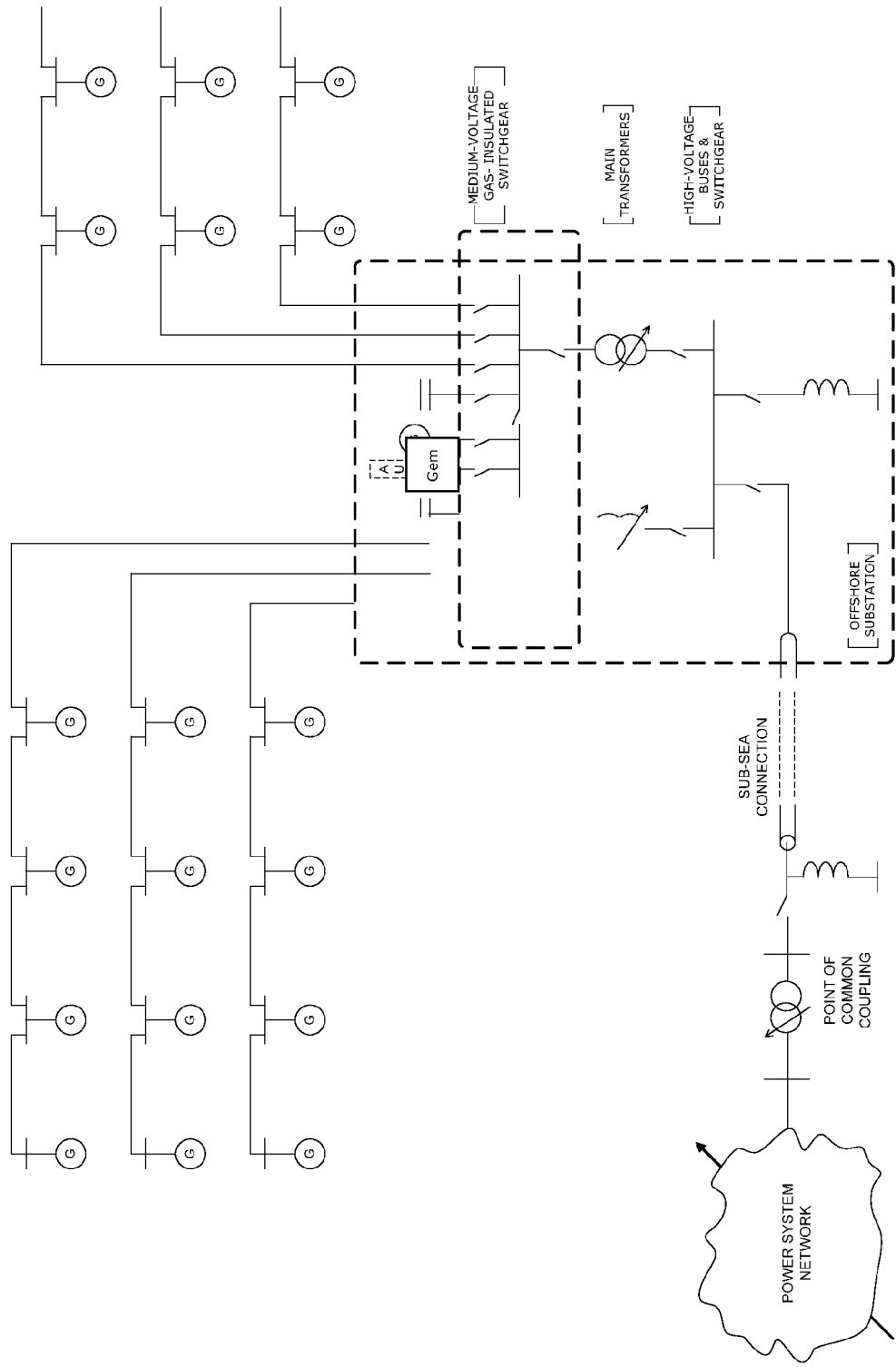
FIG. 1 shows an off-shore wind power plant.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

In general the present invention relates to a high-voltage, transformerless wind turbine generator. In particular the present invention relates to high-voltage, transformerless wind turbine generators applying full power conversion. "Transformerless" as used herein means that no step-up line transformer is needed to connect the wind turbine generator to for example a high voltage collector grid of a power plant—either an offshore or an onshore plant. The wind turbine generator may also feed into other types of grids.

"High-voltage" as used herein means a voltage level typically falling within the range 10-50 kV—either as AC or DC power. Thus, the term high-voltage as applied in the present context may also cover at least part of the medium-voltage range as defined by the IEC standard. However, other voltage levels may be applicable as well.

The present invention also relates to a high-voltage power converter suitable for being used in high-voltage drive application, such as wind turbine generators. It should be noted however that the present invention is also applicable in other power conversion applications.

Generally, there are several advantages associated with removing step-up transformers in wind turbine generators—the largest of these being:
 1. Reduction in turbine power conversion losses;
 2. Reduction in turbine component count, cost, weight, volume;
 3. Reduction in turbine component failures;
 4. Reduction in reactive power losses; and
 5. Elimination of inrush currents.

A view of a traditional wind power plant (WPP) is shown in FIG. 1. The plant shown in FIG. 1 is an offshore plant where wind turbine generators (G) are electrically connected by means of underground/subsea power cables. Each of the wind turbines generators (G) has an integrated step-up transformer. The present invention is, however, fully applicable to onshore WPPs as well. The power cables form a power collection network which routes the generated power from the turbines to a substation where transformation to a higher voltage level—suitable for longer transmission—typically takes place.

At the substation the plant power collection cables connect to a medium-voltage bus. This medium-voltage bus may also connect to the substation internal power supply (aux), to an emergency generation system (Gem), and to reactive power compensation equipment (capacitors, reactors, power electronic conversion). As the present invention is applicable to voltage levels typically in the range 10-50 kV at least part of the medium-voltage range as defined by IEC standard falls within the scope of the present invention.

Multiple main step-up transformers are typically employed in the substation depending on the actual plant power level and the design for fault tolerance. It is often required that the generated power from the plant is to be transmitted a substantial distance before meeting the back-bone transmission network at the point of common coupling (PCC) on land. Since FIG. 1 shows an offshore plant a subsea transmission cable is employed between the offshore substation and the PCC.

Figure 2:
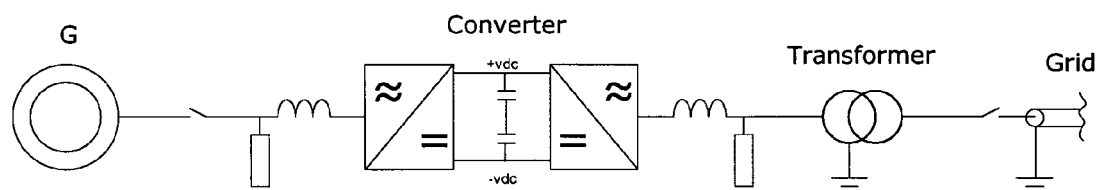
FIG. 2 shows a) a traditional wind turbine arrangement, b) a transformerless, high-voltage wind turbine arrangement generating AC power, and c) a transformerless, high-voltage wind turbine arrangement generating DC power.
Figure 2:
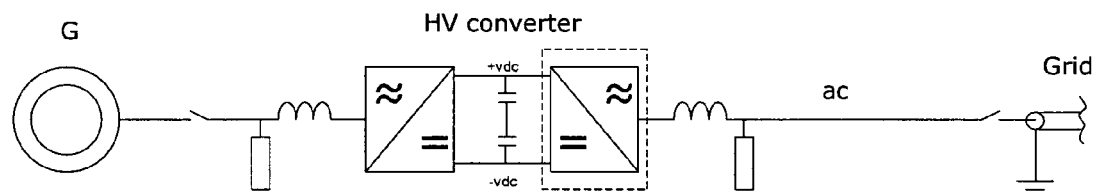
Figure 2:
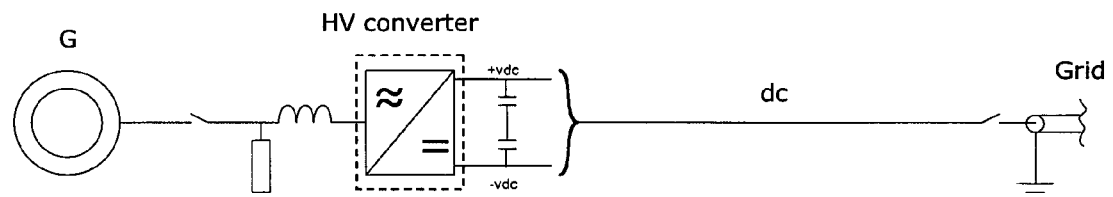

An electrical power conversion architecture of a typical wind power generator is shown in FIG. 2a. The voltage level of the collector network is typically in the range of 10-50 kVac. The voltage level of the generator and the power converter is typically 0.69-6.0 kVac. This obviously requires voltage transformation using a step-up transformer in typically every turbine. The traditional filters on the generator side and the grid side of the converter are shown as well. Moreover, the step-up transformer and the grid are depicted as being grounded. However, such grounding may not be advantageous at all sites.

The rectifier and the inverter of the converter may, or may not, be of identical topologies. Often, the rectifier and the inverter operate equally well in all 4 quadrants (active and reactive power can flow controlled in both directions). If the power generator does not require motoring, then the converter may be reduced to 1 or 2 quadrants, potentially saving on installed equipment and potentially on conversion losses.

An example of omitting the step-up transformer is shown in FIG. 2b. Omitting the step-up transformer requires that the power generator, the power converter and the collector network are of equal voltage ratings. As previously mentioned such common voltage rating is typically in the range of 10-50 kVac. Again, filters on the generator side and the grid side of the converter are shown, and the step-up transformer and the grid are again depicted as being grounded.

Referring now to FIG. 2c a high-voltage DC wind turbine generator is depicted. As depicted in FIG. 2c the power generator generates high-voltage AC power which is rectified to high-voltage DC power having a voltage typically in the range 10-50 kVdc. The high-voltage DC power is fed into a grounded high-voltage DC cable for further distribution.

The power converters shown in FIGS. 2b and 2c must be capable of operating at high voltages, such as for example in the 10-50 kV range. FIGS. 3-6 show possible implementations of suitable high-voltage converters.

Figure 3:
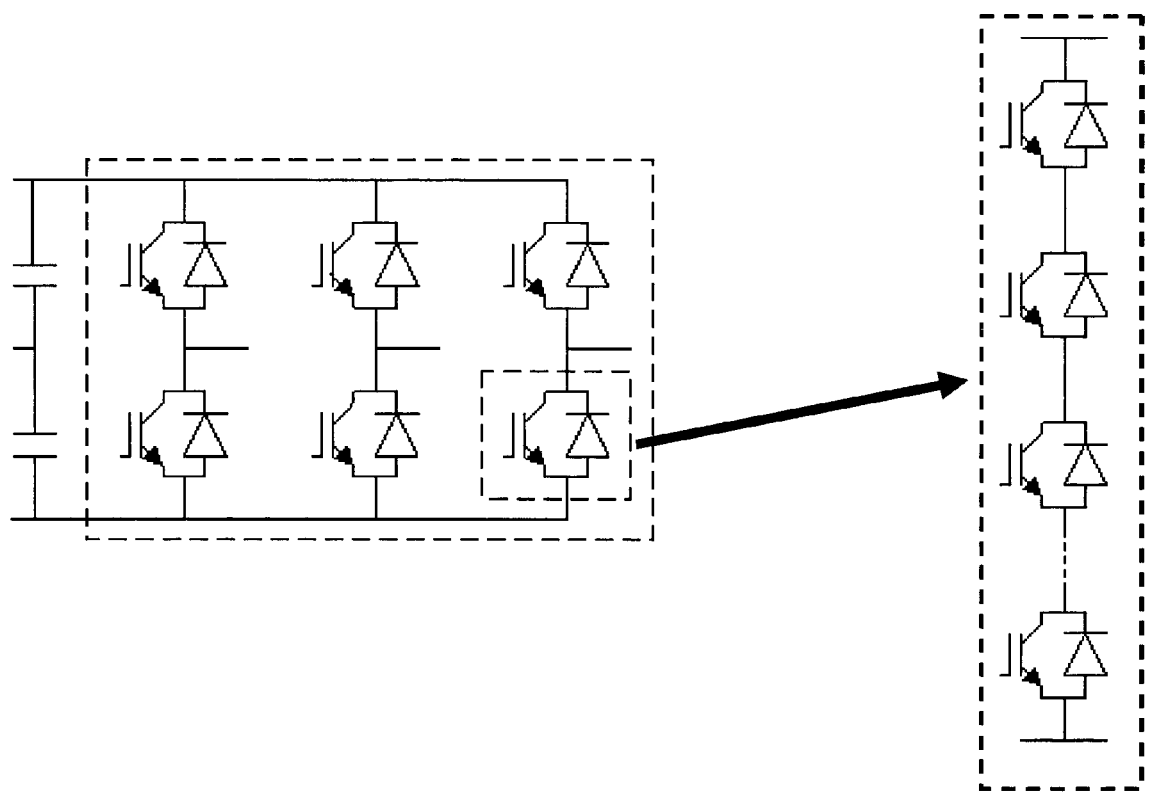
FIG. 3 shows how semiconductor valves in a low-voltage converter may be transformed into suitable high-voltage valves.
Figure 4:
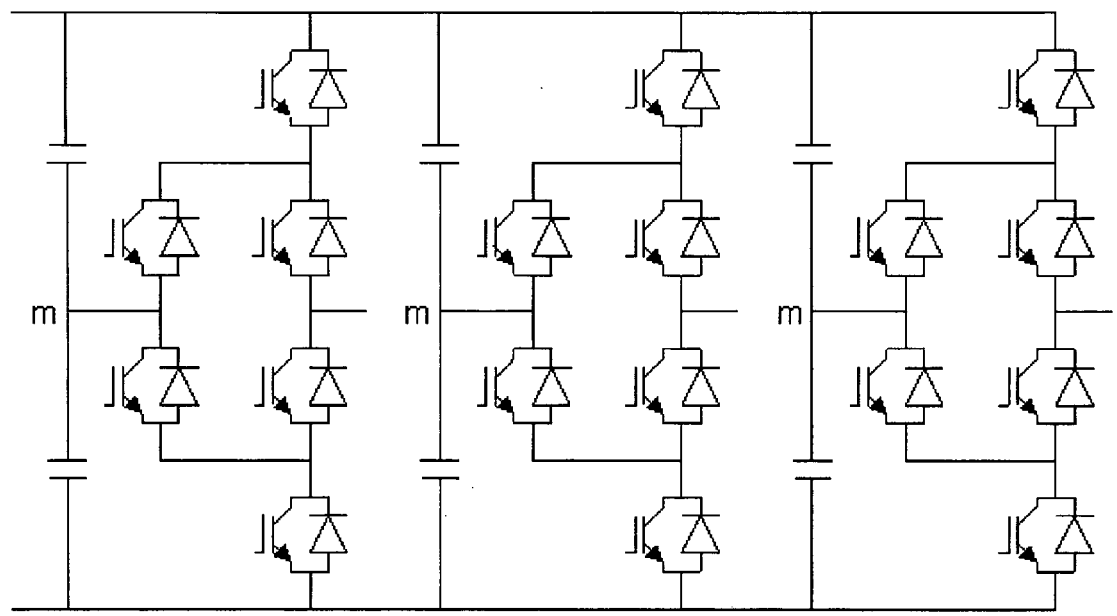
FIG. 4 shows different implementations of multi-level neutral point clamped inverters.
Figure 4:
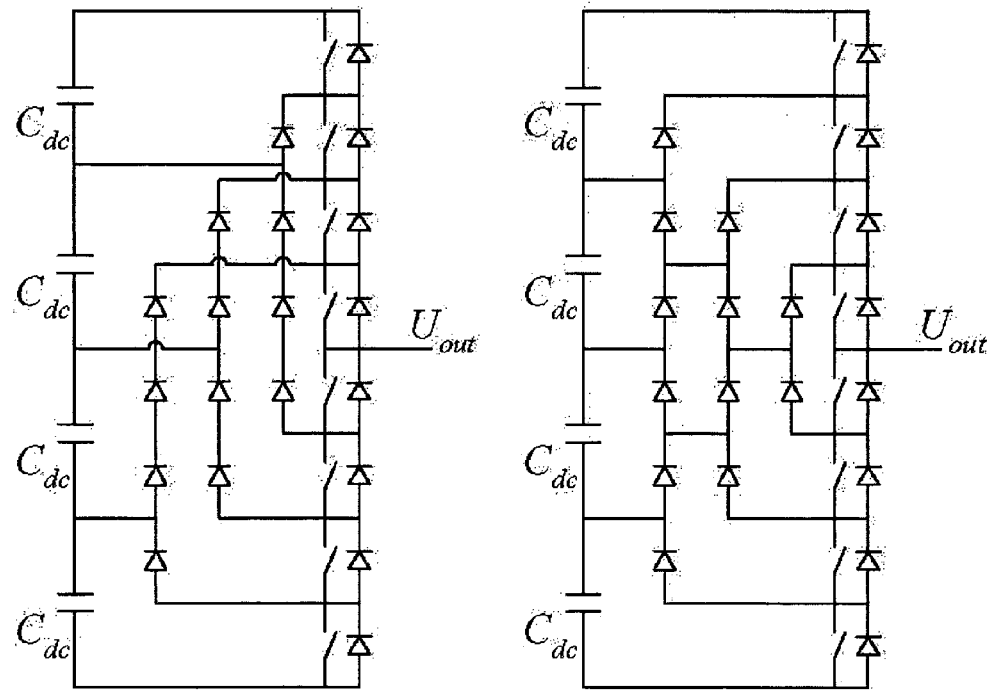

Referring now to FIG. 3 a low-voltage, forced-commutated inverter circuit is shown in the left of the figure. If this low-voltage inverter circuit is to be operable at a high-voltage level its valves must be capable of withstanding such high-voltage levels. One possible way of achieving this to replace each valve with a number of series-connected switching units as illustrated in the right hand side of FIG. 3. Each switching unit comprises a switch, said switch preferable being a fast switching type of a semiconductor power transistor, such as an IGBT, IGCT or other similar type of switch. The switch is arranged in an anti-parallel coupling with a diode. The number of parallel coupled switching units is chosen to match the voltage level to be withstand.

Another possible inverter topology is shown in FIG. 4a which shows a 3-level neutral point clamped (NPC) inverter topology. The inverter level may be increased to example 5, 7, 9 or even higher inverter levels. Two examples of 7-level single phase NPC inverter topologies are shown in FIG. 4b.

Figure 5:
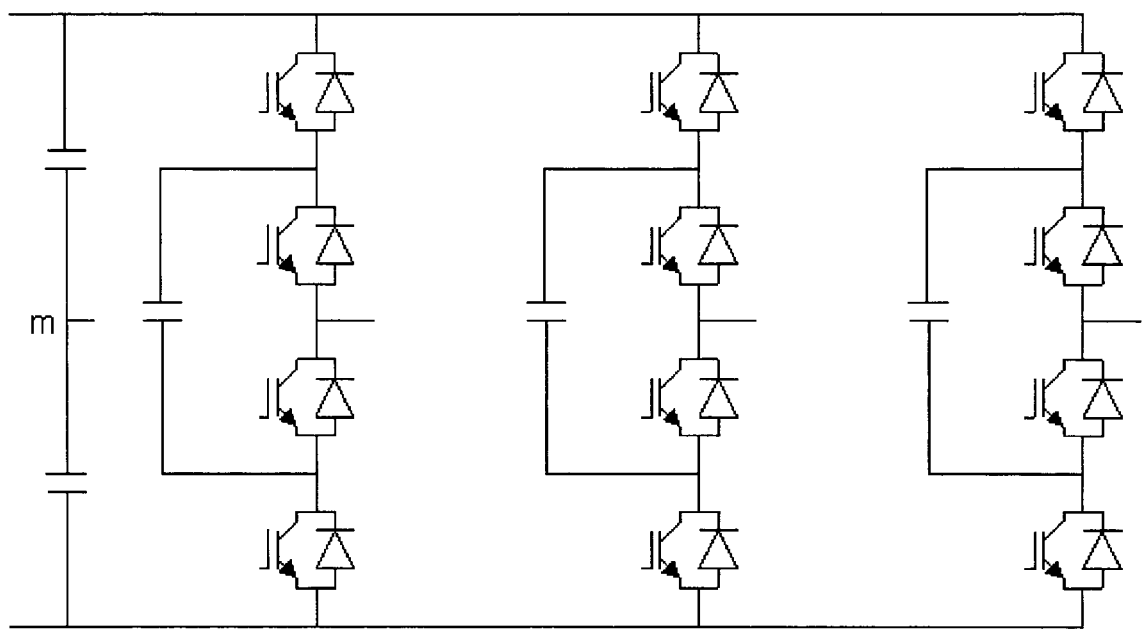
FIG. 5 shows a flying capacitor multi-level inverter.

Another 3-level inverter topology is shown in FIG. 5—also this topology is increasable to higher inverter levels. The inverter topology shown in FIG. 5 is normally referred to as the flying capacitor inverter. Also, multi-level Quasi resonant DC-link converter topologies may be applicable as well. The term "Quasi resonant" refers to the fact that these circuits are not continuously oscillating, but can be triggered by active components to perform a resonant cycle.

Figure 6:
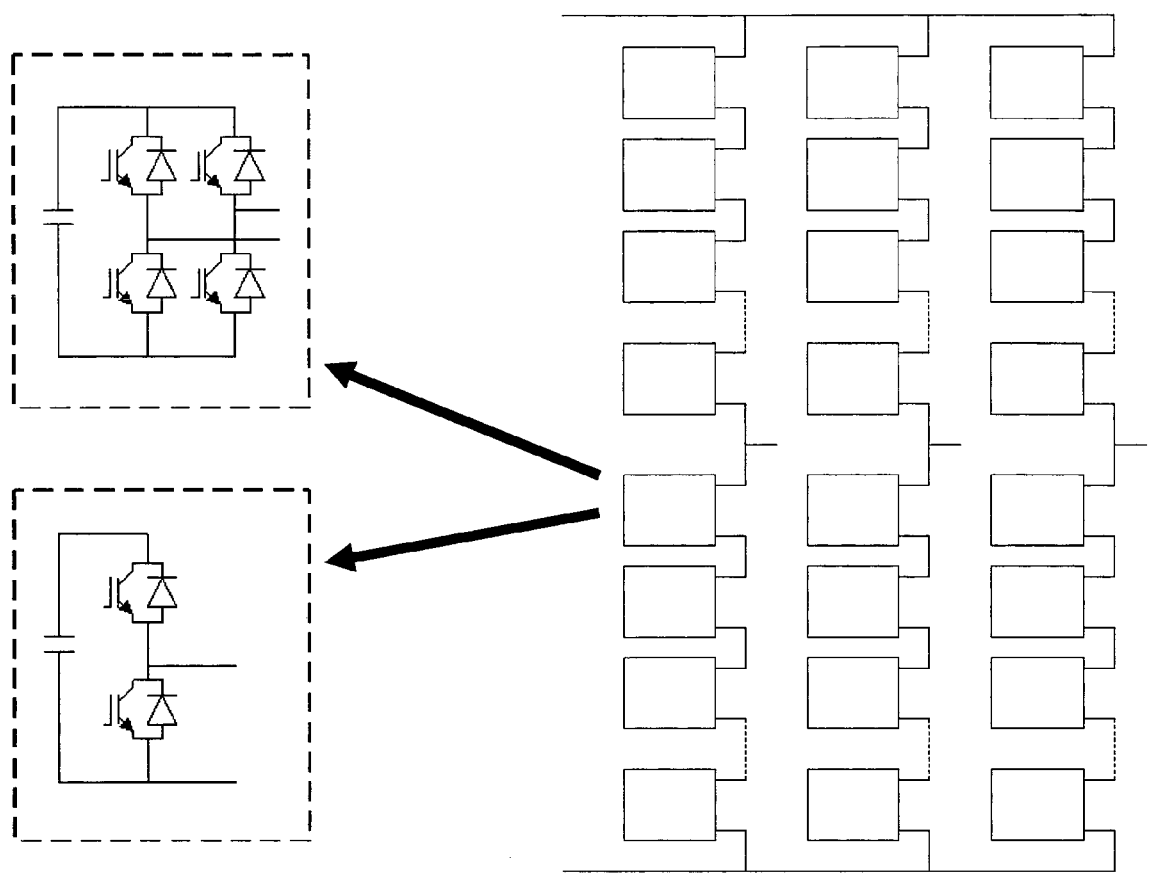
FIG. 6 illustrates how full-bridges and half-bridges can be stacked to form a high-voltage inverter.

Another and different approach in order to reach high-voltage levels may be as follows: Instead of modifying the individual valves of a basic inverter design complete inverter designs of parts thereof may be stacked as illustrated in FIG. 6 which shows how half bridges and full bridges can be stacked in order to reach a desired high-voltage level.

Figure 7:
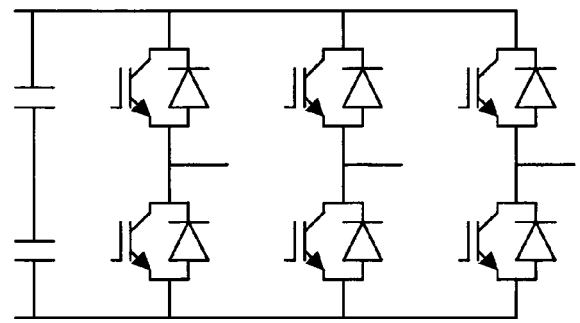
FIG. 7 shows a) a low-voltage converter unit, b) a low-voltage converter unit applying an active clamped resonant DC link (ACRDCL), and c) an ACRDCL where the functionality of the link valve is integrated into the inverter valves.
Figure 7:
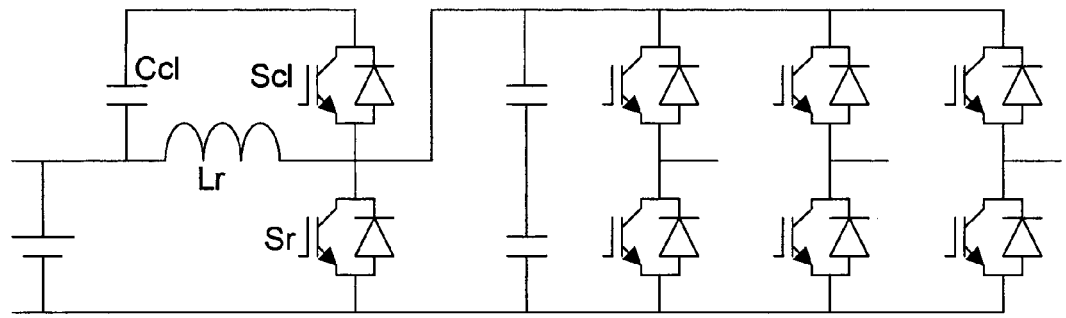
Figure 7:
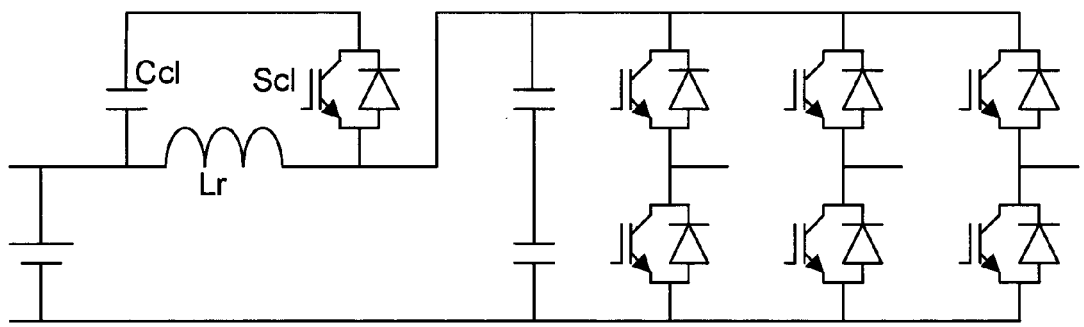

Referring now to FIG. 7a a well-known low-voltage inverter topology is shown. In the inverter circuit shown in FIG. 7a the forced-commutated valves are gated to produce a pulse-width modulated output to synthesize an ac voltage waveform of a given frequency, amplitude and angle. The inverter circuit shown in FIG. 7a may also be implemented as a so-called resonant dc-link (RDCL) circuit. The RDCL circuit employs an extra valve (link valve) and a resonant inductor in the dc-link. The inverter valves commutate under zero-voltage conditions and outputs a number of sinusoidal half-waves. Optionally, the functionality of the extra valve (link valve) may be integrated into inverter valves in case the inverter valves are implemented as a transistor and a diode coupled in an anti-parallel connection.

An important drawback of the above-mentioned RDCL circuit is that the resonant link voltage rises to at least twice the dc supply voltage. Hence, the valve voltage withstand requirements increase. In order to avoid double voltage rating on the valves a so-called voltage clamp may advantageously be implemented in the dc-link of a RDCL circuit—cf. FIG. 7b. The primitive clamp circuit consists of a clamp capacitor Ccl, and a clamp switching unit (a transistor Scl with an anti-parallel diode). The clamp capacitor and switching unit connect on either side of the resonant link inductor, Lr. The circuit shown in FIG. 7b is normally referred to as a so-called active clamp resonant dc-link (ACRDCL) circuit. In the ACRDCL circuit commutation takes place as follows:

The added clamp capacitor voltage is k×Vdc, where k is normally chosen between 0.3 and 0.5. When the resonant link voltage exceeds the sum of the supply and clamp voltages, i.e. (1+k)×Vdc, the difference between inductor current and inverter link current is fed into the clamp capacitor. As the capacitance of Ccl is much larger than Cr, the clamp capacitor voltage changes little while it is charged or discharged. Hence, the resonant link voltage Vr stays approximately constant at (1+k)×Vdc for the duration of current flowing in/out of the clamp.

While the current flows through the clamp diode (in anti-parallel with Scl), the clamp transistor Scl is turned on under zero voltage and zero current condition. At some point, when the inverter current exceeds the resonant inductor current, the clamp current changes direction and flows back out through the clamp transistor Scl. This transistor Scl is turned off when the clamp capacitor net charge exchanged with the link equals zero, hence the clamp capacitor voltage is kept constant. The duration the clamp is active varies with the Lr inductor excess energy level.

Finally, when the clamp seizes to conduct, the inverter current drains the resonant capacitor Cr and the link voltage Vr returns to zero, where the link transistor Sr turns on again. Depending on the operating point, the link diode (anti-parallel to Sr) may conduct before the transistor begins.

As for the RDCL circuit, the ACRDCL link valve Sr can be omitted and its functionality can be merged into the inverter valves, cf. FIG. 7c. It should be noted however that the functionality of the link valve can only be integrated into the inverter valves when these are force-commutated. A force-commutated valve can be implemented if only transistors are applied as switching elements in each valve. As already indicated FIG. 7c shows a low-voltage ACRDCL where the functionality of the resonant link valve is integrated into the inverter and where the clamp valve Scl is implemented as a transistor and a diode in an anti-parallel connection. In FIG. 7c the resonant inductor is denoted Lr.

For voltage levels where a single semiconductor per valve is insufficient to block the voltage in the off-state series-connected arrangements of semiconductors are required. Such series-connected arrangements of semiconductors can be realised in a number of different ways—cf. FIG. 9. A more detailed description of the various arrangements shown in FIG. 9 will be given later.

Figure 8:
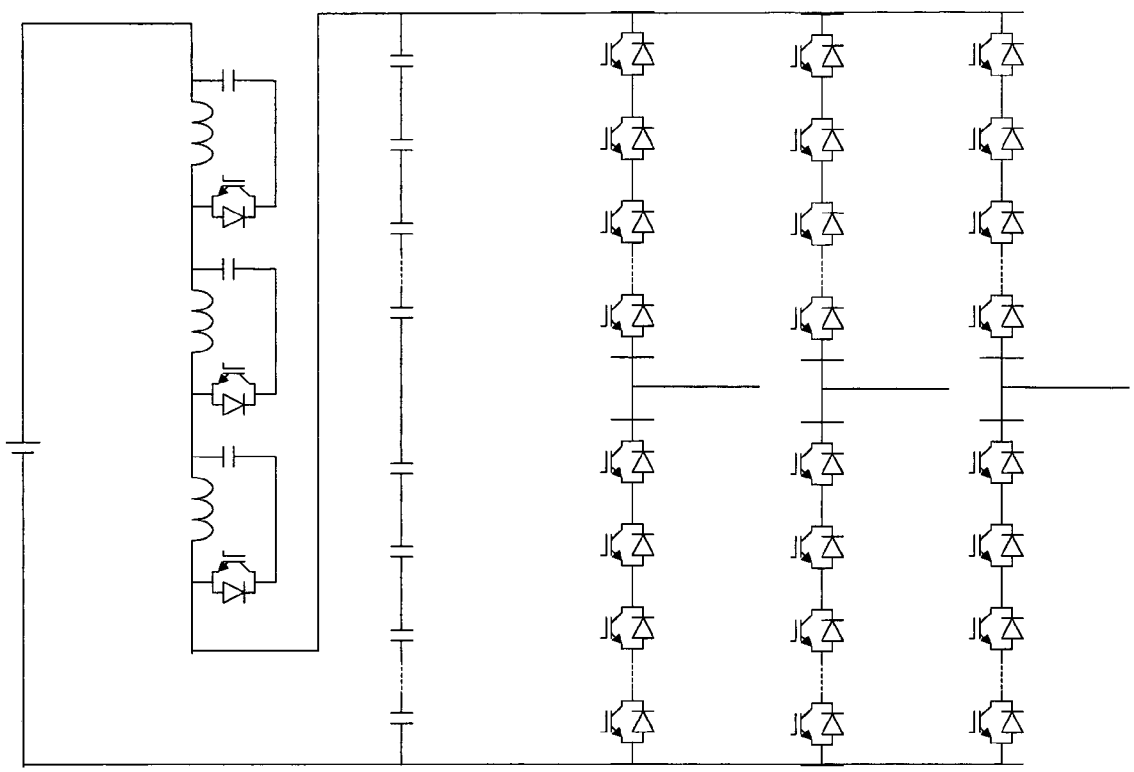
FIG. 8 shows a high-voltage power converter with series connected clamp circuits.

FIG. 8 shows one embodiment of the present invention and thereby one realisation of a high-voltage ACRDCL circuit suitable for being used as a high-voltage inverter in a high-voltage wind turbine generator. The inverter valves consist of N series-connected pairs of transistors and anti-parallel diodes. All transistors are gated simultaneously in order to achieve an effective voltage-sharing during commutation and during blocking. Still referring to FIG. 8 the resonant dc-link capacitors are also arranged in series. The functionality of the link valve has been integrated into the transistors of the inverter valves.

The link/resonant inductor, clamp capacitor and clamp valve are arranged as clamping unit circuits coupled in series. Each of the clamp valves is implemented as a switch, said switch preferable being a fast switching type of a semiconductor power transistor, such as an IGBT, IGCT or other similar type of switch. The switch is arranged in an anti-parallel connection with a diode. Clamping unit circuits may advantageously be connected in series because this avoids that transistors are coupled directly in series.

Still referring to FIG. 8 the functionality of the series-connected clamping unit circuits can advantageously operated independently. If the clamp capacitors of the circuits are different in capacitance level, then the clamp current flowing will differ between clamping unit circuits. As the governing control is to maintain the clamp capacitor energy level between cycles, then the instant of clamp current going from charging to discharging will differ between the unit circuits, and thus so will the instant of clamp transistor turn-off. The variation will be small between the clamping unit circuits.

The advantage of series-connected (almost identical) clamping unit circuits containing a power semiconductor valve, a capacitor and an inductor is that the voltage level per component can be kept sufficiently low so that no semiconductors need to be series-connected within the valve. Thus, the commutation becomes simpler as dynamic voltage balancing no longer is an issue during commutation or when blocking.

Figure 9:
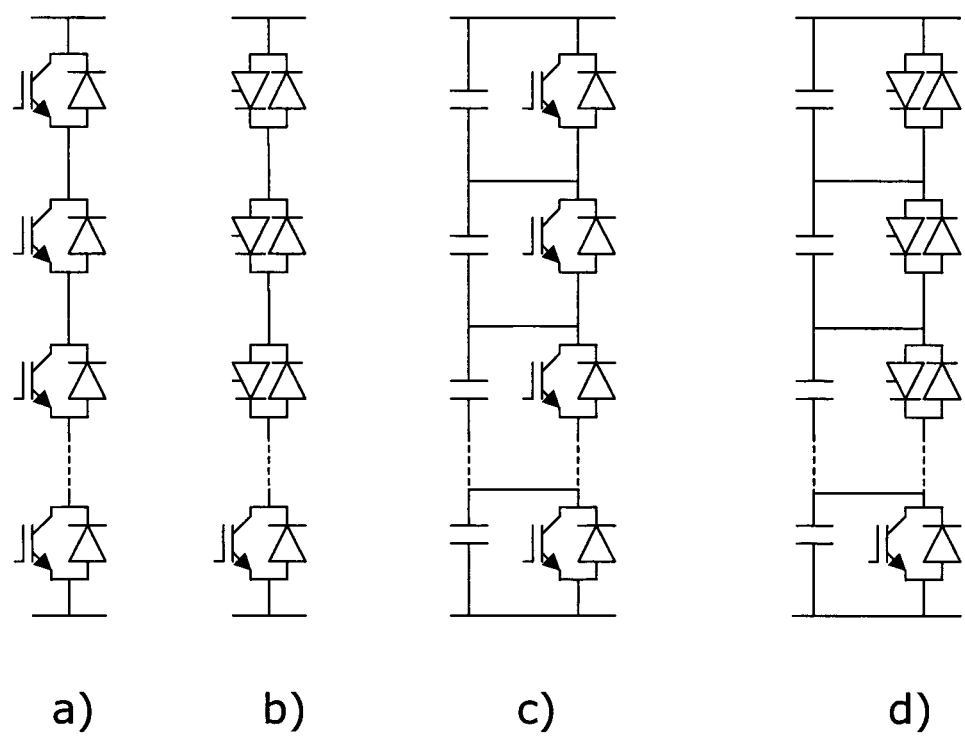
FIG. 9 shows various valves arrangements.

FIG. 9 shows alternative inverter valve implementations where FIG. 9a shows a transistor-based valve implementation, i.e. a force-commutated valve. The number of series-connected transistor/diode arrangements may obviously differ from the depicted 4 arrangements. The number of series-connected transistor/diode arrangements is normally chosen in accordance with the voltage to be blocked in the off-state. As shown in FIG. 9a a diode is coupled across each transistor thereby forming an anti-parallel connection.

In the valve implementation depicted in FIG. 9b all transistors, except one, have been replaced by thyristors. Thus, only a single transistor/diode arrangement is present in contrast to the plurality of thyristor/diode arrangements connected thereto. FIGS. 9c and 9d show valve implementations with integrated link capacitors. For the valve implementations applying thyristors the recombination time (tq) of the thyristor must be as short as possible.

Figure 10:
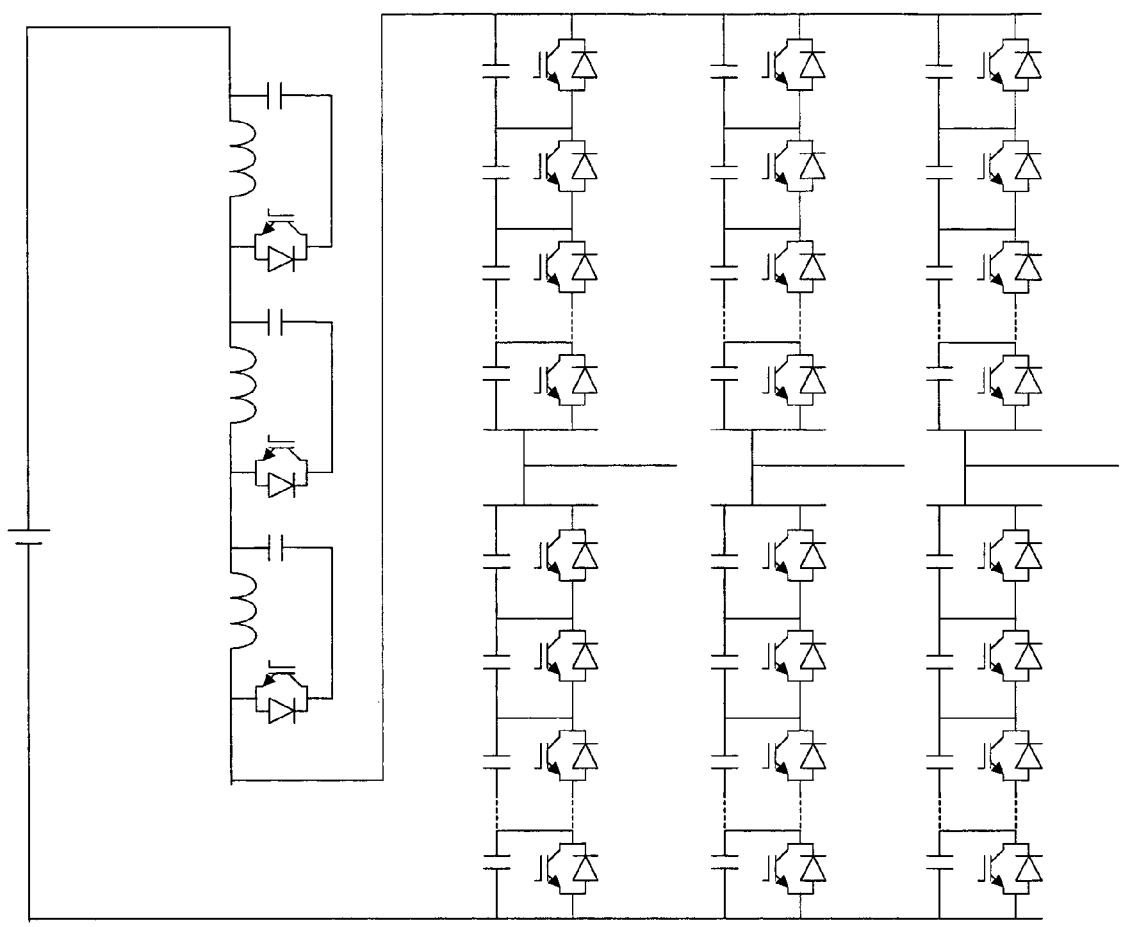
FIG. 10 shows a high-voltage power converter with series connected clamp circuits and integrated link capacitors.

FIG. 10 shows an inverter circuit where the link capacitors have been integrated into the inverter valves. Moreover, the functionality of the link valve has been integrated into the transistors of the inverter valves.

The ACRDCL circuits shown in FIGS. 8 and 10 have several advantages:
1. Voltage sharing during commutation becomes much less important if the series-connected semiconductors commutate during zero-voltage dc-link conditions.
2. The complexity of voltage sharing during blocking is unchanged with regard to the basic circuit—cf. FIG. 7a.

3. The complexity of voltage sharing during blocking is largely reduced if large capacitors are distributed along valve chain.
4. The clamp can be realised by dividing the circuit consisting of resonant inductor, clamp capacitor and clamp valve into N identical units, each subject to approximately 1/N'th of the total clamp voltage.

During operation of the embodiment shown in FIG. 10 the inverter phase-leg valves always have either top or bottom valve turned on at any one instant. During link zero-voltage periods both top and bottom valves are turned on. As the inverter switching pattern is modulated the effective resonant capacitance is created from alternating banks of valve capacitors. The amount of capacitance active in the resonant circuit will however remain constant.

The part of the link reactor current that flows to the resonant capacitors will, in the embodiment of FIG. 10, flow through the valves that are on. Hence, these valves will carry higher current compared to the embodiment of FIG. 8.

When distributing the resonant link capacitors into the valves, each valve position (transistor and anti-parallel diode) will have its terminals connected to a capacitor (see also FIG. 9c and FIG. 9d). This capacitor acts as a snubber capacitor—the rate-of-change of voltage (dV/dt) will be limited.

When the link voltage is no longer clamped, and the link voltage is resonating back down towards zero, all the distributed capacitors in the valves will discharge. During zero voltage, all valves are on and all capacitors are discharged. When the resonant inductor is sufficiently charged, some of the valves turn off. This forces the current in the valves from the transistors to the capacitors, and the capacitors will begin to charge following the same resonant cycle described above until the link voltage is clamped again.

The transistors have thus turned off at zero link voltage, upon which the gradual resonant build-up of voltage over each capacitor also builds up over each transistor in the valves. The sharing of blocking voltage between transistors is governed by the distributed capacitors. As differences in capacitances should be kept close to uniform voltage sharing is achievable. Hence, no special voltage margin is required to allow for differences between positions in the same valve.

Figure 11:
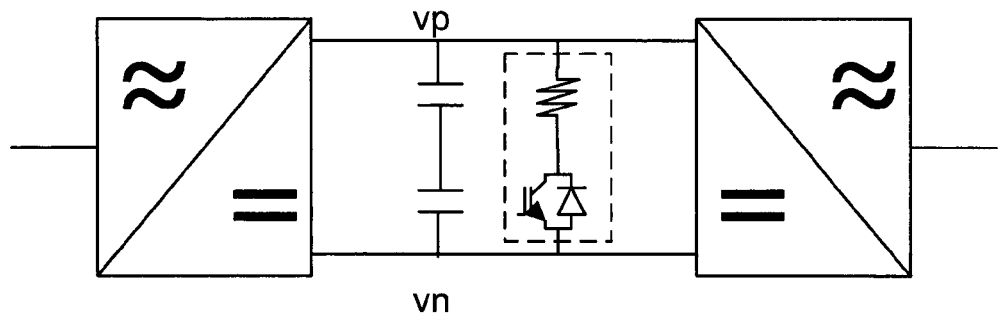
FIG. 11 shows a) a high-level block diagram of a converter including a chopper and a dump load in the DC-link, and b) a low-voltage ACRDCL inverter a chopper/dump load circuit between the dc-source and the clamping circuit.
Figure 11:
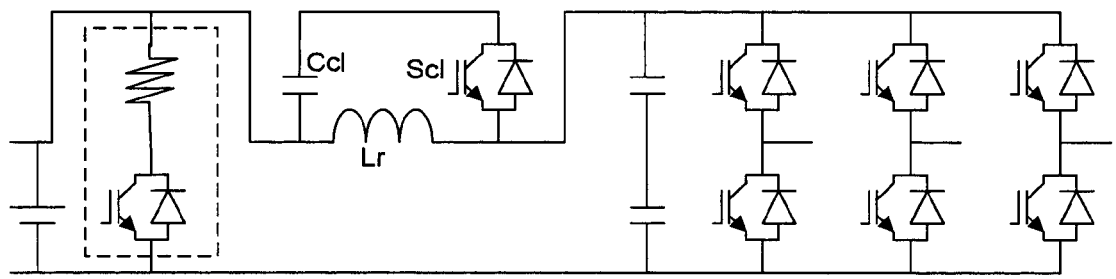

Wind turbine generators employing full power electronic conversion typically employ a dump-load so that generator power can be dissipated in the dump-load instead of flowing to the grid. FIG. 11a is an example of a dump-load (marked with dashed line) being placed in the converter dc-link.

If no power leaves the grid-connected inverter, and power continues to flow from the generator into the dc-link, the dc-link voltage will rise very rapidly. To avoid excessive voltage levels, the dump-load is engaged by switching its chopper switch on and off. The chopper switch should preferable be a fast switching type of a semiconductor power transistor, such as an IGBT, IGCT or other similar type of switch. The rating of the dump-load resistor and the chopper power semiconductors determine the energy that may be dissipated. Typically, nominal power for a period of 1 to 5 seconds is the design criteria.

In the ACRDCL circuit, a similar arrangement can be realised as depicted in FIG. 11b where the dump-load is placed between the dc-source and the clamping circuit. Alternatively, the dump-load could be placed between the clamping circuit and inverter circuit. The functionality of the resonant link valve is integrated into the inverter.

Figure 12:
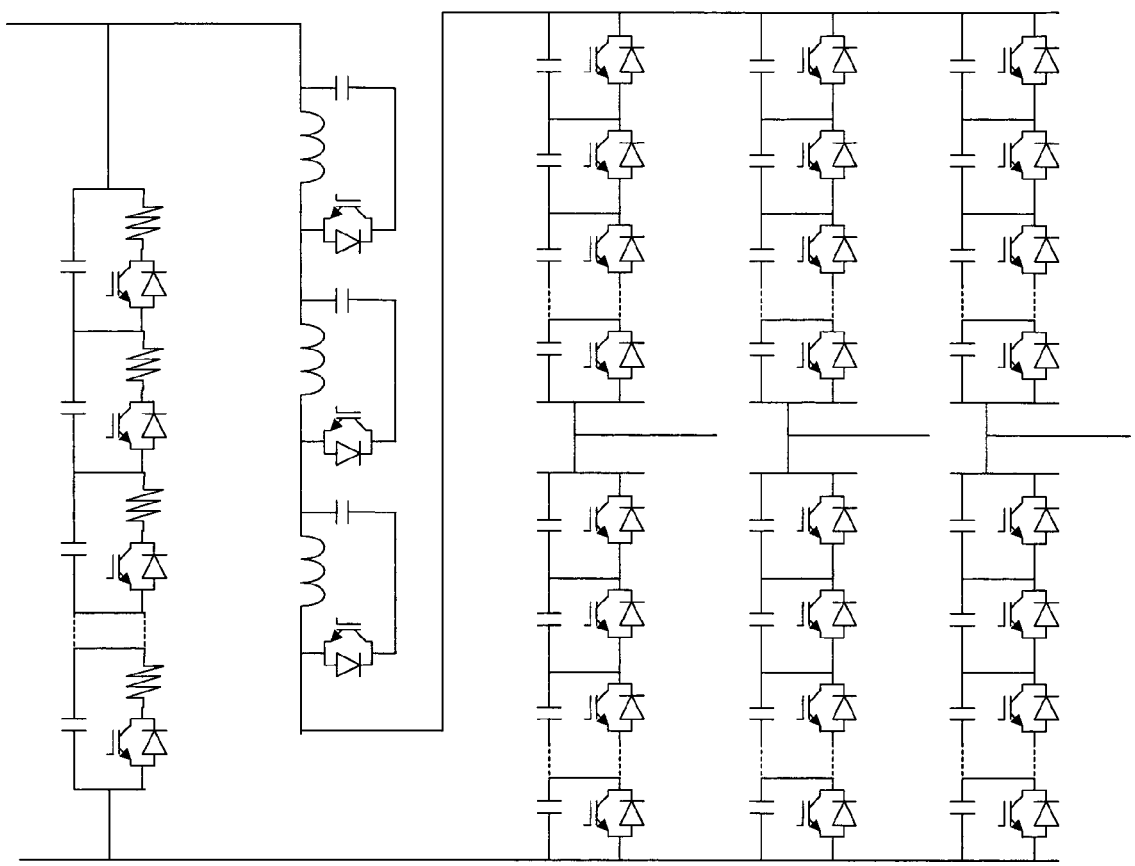
FIG. 12 shows a high-voltage ACRDCL inverter including series-connected chopper/dump load circuits in the DC-link.

In FIG. 12 an example of a circuit to overcome series-connection of the chopper power semiconductors is shown. The dump load and chopper are integrated into the dc-link capacitors in series-connected units. In this manner, the unit voltage can be kept at a level where series connection of power semiconductors is not required.

What is claimed is:

1. A high-voltage power converter comprising:
    a direct current (DC) link;
    one or more controllable switching valves, each switching valve comprising a plurality of series-connected switching units;
    a plurality of series-connected clamping circuits connected between the DC link and the one or more controllable switching valves, each clamping circuit comprising a respective clamping capacitor, a respective link inductor and a respective clamping switching unit; and
    a resonance circuit coupled with the DC link and with the one or more controllable switching valves, the resonance circuit comprising a resonant link inductor and a link capacitor, wherein the resonant link inductor is formed using a series connection of the link inductors of the plurality of series-connected clamping circuits.

2. A high-voltage power converter according to claim 1, wherein the power converter is adapted to generate power voltage levels between 10 and 50 kV.

3. A high-voltage power converter according to claim 1, wherein at least one of the series-connected switching units comprises a transistor and a diode coupled in an anti-parallel connection.

4. A high-voltage power converter according to claim 1, wherein at least one of the series-connected switching units comprises a thyristor and a diode coupled in an anti-parallel connection.

5. A high-voltage power converter according to claim 1, wherein the one or more switching valves comprises series-connected first and second switching units, wherein the first switching unit comprises a transistor and a diode coupled in an anti-parallel connection, and wherein the second switching unit comprises a thyristor and a diode coupled in an anti-parallel connection.

6. A high-voltage power converter according to claim 1, wherein the link capacitor is formed by a plurality of distributed link capacitors.

7. A high-voltage power converter according to claim 6, wherein at least one of the series-connected switching units comprises one of the plurality of distributed link capacitors.

8. A high-voltage power converter according to claim 7 wherein each of the series-connected switching units comprises a respective one of the plurality of distributed link capacitors.

9. A high-voltage power converter according to claim 1, further comprising a plurality of series-connected energy dissipating circuits.

10. A high-voltage power converter according to claim 9, wherein each of the series-connected energy dissipating circuits comprises a chopper switch and a dump load.

11. A high-voltage wind turbine generator comprising a high-voltage power converter comprising:
    a direct current (DC) link;
    one or more controllable switching valves, each switching valve comprising a plurality of series-connected switching units;
    a plurality of series-connected clamping circuits connected between the DC link and the one or more controllable switching valves, each clamping circuit comprising a respective clamping capacitor, a respective link inductor and a respective clamping switching unit; and
    a resonance circuit coupled with the DC link and with the one or more controllable switching valves, the resonance circuit comprising a resonant link inductor and a link capacitor, wherein the resonant link inductor is formed using a series connection of the link inductors of the plurality of series-connected clamping circuits.

12. A wind power plant comprising a plurality of high-voltage wind turbine generators, each high-voltage wind turbine generator comprising a high-voltage power converter comprising:
   a direct current (DC) link;
   one or more controllable switching valves, each switching valve comprising a plurality of series-connected switching units;
   a plurality of series-connected clamping circuits connected between the DC link and the one or more controllable switching valves, each clamping circuit comprising a respective clamping capacitor, a respective link inductor and a respective clamping switching unit; and
   a resonance circuit coupled with the DC link and with the one or more controllable switching valves, the resonance circuit comprising a resonant link inductor and a link capacitor, wherein the resonant link inductor is formed using a series connection of the link inductors of the plurality of series-connected clamping circuits.

13. A high-voltage power converter according to claim 1, wherein each clamping circuit comprises the link inductor in parallel with a series connection of the clamp capacitor and the clamp switching unit, wherein the clamp switching unit comprises a semiconductor power transistor with an antiparallel connected diode.

14. A high-voltage power converter according to claim 1, wherein the clamp switching units corresponding to the plurality of series-connected clamping unit circuits are arranged to be operated independently of each other.

15. A high-voltage wind turbine generator according to claim 11, wherein the high-voltage power converter further comprises a plurality of series-connected energy dissipating circuits.

16. A high-voltage wind turbine generator according to claim 15, wherein each of the series-connected energy dissipating circuits comprises a chopper switch and a dump load.

17. A wind power plant according to claim 12, wherein the high-voltage power converters further comprise a plurality of series-connected energy dissipating circuits.

18. A wind power plant according to claim 17, wherein each of the series-connected energy dissipating circuits comprises a chopper switch and a dump load.

* * * * *